(12) United States Patent
Park et al.

(10) Patent No.: US 10,586,967 B2
(45) Date of Patent: Mar. 10, 2020

(54) CELLULOSE-BASED MULTILAYER SEPARATOR

(71) Applicant: LG CHEM, LTD., Seoul (KR)

(72) Inventors: Jong-Pil Park, Daejeon (KR); Jong-Hun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 138 days.

(21) Appl. No.: 15/545,129

(22) PCT Filed: Mar. 30, 2016

(86) PCT No.: PCT/KR2016/003270
§ 371 (c)(1),
(2) Date: Jul. 20, 2017

(87) PCT Pub. No.: WO2016/159658
PCT Pub. Date: Oct. 6, 2016

(65) Prior Publication Data
US 2018/0013117 A1    Jan. 11, 2018

(30) Foreign Application Priority Data

Mar. 30, 2015  (KR) .................. 10-2015-0044449
Mar. 29, 2016  (KR) .................. 10-2016-0037844

(51) Int. Cl.
*H01M 2/16* (2006.01)
*B32B 3/26* (2006.01)
(Continued)

(52) U.S. Cl.
CPC ............ *H01M 2/1666* (2013.01); *B32B 3/26* (2013.01); *B32B 5/16* (2013.01); *B32B 5/30* (2013.01);
(Continued)

(58) Field of Classification Search
None
See application file for complete search history.

(56) References Cited

U.S. PATENT DOCUMENTS

2011/0236744 A1   9/2011  Kim et al.
2011/0256443 A1  10/2011  Park et al.
(Continued)

FOREIGN PATENT DOCUMENTS

EP    1 359 632 A2   11/2003
JP    2003-317693 A  11/2003
(Continued)

OTHER PUBLICATIONS

Machine translation of Toyoda, JP 2015-041601 (Year: 2015).*
International Search Report for PCT/KR2016/003270 (PCT/ISA/210) dated Aug. 3, 2016.

*Primary Examiner* — Wojciech Haske
(74) *Attorney, Agent, or Firm* — Birch, Stewart, Kolasch & Birch, LLP

(57) ABSTRACT

The present invention relates to a separator for a secondary battery which is capable of improving a shut-down function of a cellulose-based multilayer separator physically having high strength. The separator for a secondary battery comprises a substrate formed of cellulose-based nanofibers and polyethylene nanoparticles; and a resin layer stacked on one surface or both surfaces of the substrate, the resin being formed from a polyolefin.

11 Claims, 1 Drawing Sheet

(51) Int. Cl.
- *B32B 7/04* (2019.01)
- *B32B 5/30* (2006.01)
- *B32B 5/16* (2006.01)
- *B32B 23/08* (2006.01)
- *B32B 27/12* (2006.01)
- *B32B 27/32* (2006.01)
- *B32B 27/06* (2006.01)

(52) U.S. Cl.
CPC ........... *B32B 7/04* (2013.01); *B32B 23/08* (2013.01); *B32B 27/12* (2013.01); *B32B 27/32* (2013.01); *H01M 2/1626* (2013.01); *H01M 2/1653* (2013.01); *B32B 27/06* (2013.01); *B32B 2250/03* (2013.01); *B32B 2250/40* (2013.01); *B32B 2260/025* (2013.01); *B32B 2260/046* (2013.01); *B32B 2262/04* (2013.01); *B32B 2264/0257* (2013.01); *B32B 2264/10* (2013.01); *B32B 2307/204* (2013.01); *B32B 2307/54* (2013.01); *B32B 2307/732* (2013.01); *B32B 2457/10* (2013.01); *H01M 2/1633* (2013.01)

(56) References Cited

U.S. PATENT DOCUMENTS

| | | |
|---|---|---|
| 2013/0251890 A1 | 9/2013 | Lee et al. |
| 2015/0010798 A1 | 1/2015 | Sawai et al. |
| 2015/0118540 A1* | 4/2015 | Fujiwara ............ H01M 2/162 |
| | | 429/144 |
| 2015/0171395 A1 | 6/2015 | Ikuma et al. |

FOREIGN PATENT DOCUMENTS

| | | |
|---|---|---|
| JP | 2011-528843 A | 11/2011 |
| JP | 2013-178934 A | 9/2013 |
| JP | 2013-209788 A | 10/2013 |
| JP | 2015-41601 A | 3/2015 |
| KR | 10-1040572 B1 | 6/2011 |
| KR | 10-2012-0109257 A | 10/2012 |
| KR | 10-2014-0078966 A | 6/2014 |
| KR | 10-2014-0085728 A | 7/2014 |
| KR | 10-2014-0146094 A | 12/2014 |

* cited by examiner

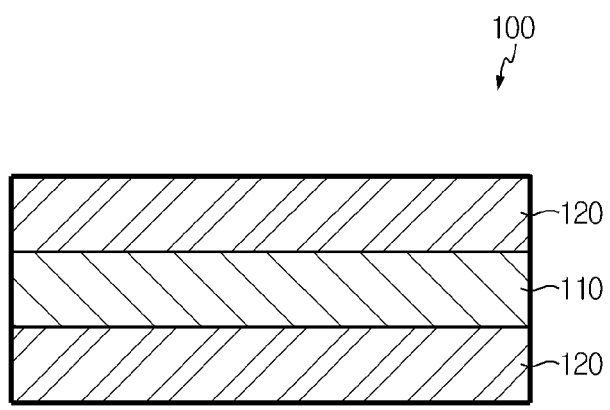

CELLULOSE-BASED MULTILAYER SEPARATOR

TECHNICAL FIELD

The present disclosure relates to a separator for a secondary battery, and more particularly, to a separator for a secondary battery which has an improved shut-down function.

The present application claims priority to Korean Patent Application No. 10-2015-0044449 filed on Mar. 30, 2015, and Korean Patent Application No. 10-2016-0037844 filed on Mar. 29, 2016, the disclosures of which are incorporated by reference herein in its entirety.

BACKGROUND ART

Recently, interest in energy storing technologies continues to increase. As application areas expand to energies for mobile phones, camcorders and notebook PCs and further to electric vehicles, more systematic efforts are made for the researches and developments of electrochemical devices. In this aspect, electrochemical element is the area gathering the most attention, and most of all, developing a secondary battery capable of charging and discharging is becoming the focus of attention, and recently, in developing such batteries, research and development is under way to design new electrodes and batteries in order to improve capacity density and specific energy.

Among the currently-available secondary batteries, lithium secondary battery developed in the early 1990s is coming into spotlight because of advantages such as higher operating voltage and superior energy density compared to conventional batteries such as Ni-MH, Ni—Cd, lead-sulfate batteries, and the like that use an aqueous solution electrolyte.

As technological development and demand for mobile devices increase, demand for secondary batteries as an energy source is rapidly increasing, and recently, use of secondary batteries as a driving source for electric vehicles (EVs) and hybrid electric vehicles (HEVs) is being realized. Accordingly, numerous researches are being conducted on secondary batteries that could respond to various demands, and especially, there is high demand for lithium secondary batteries having high energy density, high discharging voltage and output stability.

A lithium secondary battery consists of a cathode, an anode, an electrolyte and a separator. Particularly, the separator is interposed between the cathode and the anode so as to electrically insulate the cathode and the anode from each other, and it is required to have the characteristic that increases the permeability of lithium ions based on high porosity so as to increase the ion conductivity. The separator is generally made of a polyolefin-based material or a cellulose. The polyolefin-based polymeric material is advantageous in forming pores, has excellent chemical resistance, mechanical property and thermal characteristic, but also has extreme thermal shrinkage at high temperatures, and physical vulnerability. The cellulose can be used to prepare a separator having high physical strength, but is problematic in that it cannot serve the function of breaking current in an abnormal operating environment.

DISCLOSURE

Technical Problem

The present disclosure is designed to solve the problems of the related art, and therefore the present disclosure is directed to providing a cellulose-based separator for a secondary battery, which can have high physical strength and improved shut-down function, and a preparation method thereof.

Technical Solution

In one aspect of the present disclosure, there is provided a separator for a secondary battery, comprising:

a substrate comprising a cellulose-based nanofiber and polyethylene nano particles, and a resin layer stacked on one surface or both surfaces of the substrate, the resin being formed from a polyolefin.

Preferably, the polyolefin may be at least one selected from a group consisting of polyethylene, polypropylene, polybutylene and polypentene.

The polyethylene nano particle may have a melting point of 80 to 100□, and the polyolefin resin may have a melting point of 100 to 140□.

Preferably, the resin layer may further comprise inorganic particles and polymeric binder.

The resin layer may be stacked in a lamination method.

The resin layer may have a thickness of 3 to 20 μm, and the substrate may have a thickness of 5 to 20 μm.

Preferably, the cellulose-based nanofiber may be made of at least one selected from a group consisting of cellulose acetate, cellulose triacetate and cellulose butylate.

Preferably, the cellulose-based nanofiber may be a diameter of 10 nm to 500 nm and a length of 1 μm to 10 mm, and the polyethylene nano particle may have a particle size of 50 nm to 500 nm.

Preferably, the cellulose-based nanofiber and polyethylene nano particle may be present in a weight ratio of 7:3 to 9:1.

In another aspect of the present disclosure, there is provided a method of preparing a separator for a secondary battery, the method comprising forming a sheet using a mixture of a cellulose nanofiber and polyethylene nano particles dispersed in a solvent; removing the solvent to provide a porous substrate; and stacking a resin layer formed from polyolefin on one or both surfaces of the substrate in a lamination method.

Preferably, the solvent may comprise a resin for forming pores and at least one selected from water, methyl alcohol, ethyl alcohol, propyl alcohol, acetone, ethyl acetate, methyl ethyl ketone and toluene.

Preferably, the resin for forming pores may be at least one selected from a group consisting of polyethylene glycol, polyvinyl alcohol and polyvinyl propylene.

Advantageous Effects

The separator according to the present disclosure has high physical strength, and thus excellent safety, and also it has improved shut-down function to provide high stability.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

FIG. 1 is a view schematically illustrating a cross-sectional structure of a separator according to one aspect of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A separator made of a conventional cellulose material has high physical strength, but is problematic in that it cannot serve the function of blocking current in an abnormal operating environment.

The separator according to the present disclosure can provide a shut-down function by having a polyolefin resin layer on at least one surface of a substrate that comprises a cellulose-based nanofiber, and it can have improved shut-down characteristics by comprising polyethylene nano particles with a relatively low melting point, in addition to the cellulose-based nanofiber, in the substrate.

FIG. 1 is a view schematically illustrating a cross-sectional structure of a separator according to one aspect of the present disclosure. Referring to FIG. 1, a separator for a secondary battery 100 according to one aspect of the present disclosure has a substrate 110 that comprises a cellulose-based nanofiber and polyethylene nano particles; and a polyolefin resin layer 120 formed on both surfaces of the substrate.

The polyethylene nano particle present in the substrate may have a melting point of 80 to 100□, and a particle size of 50 nm to 500 nm. The polyethylene nano particle may have a relatively lower range of melting point unlike conventional polyethylene, thereby improving the shut-down characteristics of the cellulose-based separator. Further, the polyethylene nano particle may have an average molar mass of 500 g/mole to 900 g/mole.

The polyethylene nano particles will be explained based on the manufacturing examples shown hereinafter, but there is no limitation thereto.

1. A Ni-methyl complex (Me(OCH$_2$CH$_2$)$_n$NH$_2$) is added to 100 ml of distilled water at room temperature, and the resulting mixture was stirred for 2 minutes to obtain a uniform solution.

2. The solution is put into a reactor where 40 bar of pressure may be applied, and a certain amount of ethylene is continuously injected.

3. After an adequate reaction time, the reactor is opened, followed by obtaining a dispersant through a glass wool plug.

4. The obtained dispersant is washed three (3) times using methanol, and dried under a vacuum condition of 50□, to prepare polyethylene nano particles.

The polyethylene nano particles may be prepared in the form of nano particles using a Ni catalyst, and may be prepared by having them prepared in the form of PE magnetic composite particles together with iron oxide particles, and then removing metal ingredients through acidizing.

The cellulose-based nanofiber and polyethylene nano particle may be included in a weight ratio of 7:3 to 9:1. In the case of satisfying said weight ratio, bonding between the cellulose nanofibers is not interrupted, a separator can be prepared easily, and an adequate level of shut-down characteristics can be provided.

The resin layer may be prepared in the form of film, and may be stacked on one surface or both surfaces of a substrate in a lamination method. In the case of a general coating method, a polymeric resin is melted in a solvent and then applied, but this method has problems of long processing time and low productivity. Since the resin layer according to the present disclosure is prepared in the form of film and stacked in a lamination method, there is no need to use a solvent, thus simplifying the preparation process. Further, since the resin layer is prepared separately, characteristics such as the thickness, porosity, composition and the like of the resin layer can be adjusted easily.

The thickness of the resin layer may be 3 to 20 μm, and the thickness of the substrate may be 5 to 20 μm.

The resin layer provides a shut-down function, and the polyolefin resin may be at least one selected from a group consisting of polypropylene, polybutylene and polypentene. Preferably, the polyethylene may be low density polyethylene (LDPE). Further preferably, a polyolefin resin having a melting point of 100 to 140□ may be used.

Further, the resin layer may further comprise inorganic particles and a polymeric binder.

There is no particular limitation to the inorganic particles as long as they are to electrochemically stable. That is, there is no particular limitation to the inorganic particles that may be used in the present disclosure as long as they do not generate oxidation and/or reduction reaction in an operating voltage range (for example, 0 to 5 V on the basis of Li/Li$^+$). Especially, in the case of using inorganic particles having ion transfer capabilities, it is possible to increase ion conductivity inside the electrochemical device to promote improvement of performance.

Further, the use of inorganic particles having high dielectricity may contribute to increase of electrolyte salt in a liquid electrolyte, for example, the dissociation degree of lithium salt, and improve ion conductivity of the electrolyte.

Due to the aforementioned reasons, the inorganic particle may include inorganic particles of high dielectricity of which the dielectric constant is 5 or more, for example, about 10 or more, inorganic particles having ion transfer capabilities, or a mixture thereof. Non-limiting examples of the inorganic particles having a dielectric constant of 5 or more include BaTiO$_3$, Pb(Zr,Ti)O$_3$(PZT), Pb$_{1-x}$La$_x$Zr$_{1-y}$Ti$_y$O$_3$(PLZT), PB(Mg$_{1/3}$Nb$_{2/3}$)O$_3$—PbTiO$_3$(PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC, boehmite, or mixtures thereof.

Especially, the inorganic particles such as the aforementioned BaTiO$_3$, Pb(Zr,Ti)O$_3$(PZT), Pb$_{1-x}$La$_x$Zr$_{1-y}$Ti$_y$O$_3$ (PLZT), PB(Mg$_{1/3}$Nb$_{2/3}$)O$_3$—PbTiO$_3$(PMN-PT) and hafnia (HfO$_2$) not only exhibit high dielectricity characteristics of a dielectric constant of about 100 or more, but also have piezoelectricity where, when tensioned or compressed by a certain pressure being applied, electrons are generated, causing a difference of potential between both surfaces, and therefore prevent an internal short-circuit of both electrodes from being caused by external impact, and promote improvement of safety of the electrochemical device. Further, when using both the aforementioned inorganic particles of high dielectricity and the inorganic particles having lithium ion transfer capabilities, their synergistic effect can be doubled.

The inorganic particles having lithium ion transfer capabilities refer to inorganic particles that contain lithium elements but transfer the lithium ions instead of storing lithium, and since these inorganic particles having lithium ion transfer capabilities can transfer and move lithium ions due to a kind of defect existing inside the particle structure, the lithium ion conductivity inside the battery may be improved, whereby the battery performance may be improved as well. Non-limiting examples of the inorganic particles having lithium ion transfer capabilities include $(LiAlTiP)_xO_y$ type glass ($0<x<4$, $0<y<13$) such as lithium phosphate ($Li_3PO_4$), lithium titanium phosphate ($Li_xTi_y(PO_4)_3$, $0<x<2$, $0<y<3$), lithium aluminum titanium phosphate ($LixAlyTiz(PO_4)_3$, $0<x<2$, $0<y<1$, $0<z<3$), and $14Li_2O-9Al_2O_3-38TiO_2-39P_2O_5$, lithium germanium thiophosphate ($Li_xGe_yP_zS_w$, $0<x<4$, $0<y<1$, $0<z<1$, $0<w<5$) such as lithium lanthan titanate ($Li_xLa_yTiO_3$, $0<x<2$, $0<y<3$), and $Li_{3.25}Ge_{0.25}P_{0.75}S_4$, lithium nitride ($Li_xN_y$, $0<x<4$, $0<y<2$) such as $Li_3N$, $SiS_2$ type glass($Li_xSi_z$, $0<x<3$, $0<y<2$, $0<z<4$) such as $Li_3PO_4$—$Li_2S$—$SiS_2$, $P_2S_5$ type glass ($Li_xP_yS_x$, $0<x<3$, $0<y<3$, $0<z<7$) such as LiI—$Li_2S$—$P_2S_5$, or a mixture thereof.

As the polymeric binder, polymethyl methacrylate, polyacrylonitrile. polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, acrylonitrile-styrene-butadiene copolymer, and polyimide may be used alone, or a mixture of two or more thereof may be used, but there is no limitation thereto.

The celluose-based nanofiber may be made of one or more selected from ethyl cellulose, methyl cellulose, hydroxypropyl cellulose, hydroxyethyl cellulose, hydroxypropyl methyl cellulose, hydroxyethyl methyl cellulose, carboxymethyl cellulose, cellulose acetate, cellulose triacetate, cellulose acetate phthalate, nitrocellulose, cellulose acetate butylate, cellulose acetate propionate, ammonium thereof, and salt thereof.

The diameter of the cellulose-based nanofiber may be 10 to 500 nm, and the length thereof may be 1 μm to 10 mm.

Further, another aspect of the present disclosure provides a method for preparing the aforementioned separator for a secondary battery, the method comprising forming a sheet using a mixture of a cellulose nanofiber and polyethylene nano particles dispersed in a solvent; removing the solvent to provide a porous substrate; and stacking a resin layer made of polyolefin resin on one surface or both surfaces of the substrate in a lamination method.

By adjusting the mixing ratio of the cellulose nanofiber and solvent in the mixture, the porosity and thickness of the substrate may be controlled easily. Preferably, the cellulose nanofiber and the solvent may be present in a weight ratio of 6:4 to 8:2.

The solvent comprises a resin for forming pores, which may bond the cellulose nanofibers and form a porous structure of the substrate, and may further comprise at least one selected from a group consisting of water, methyl alcohol, ethyl alcohol, propyl alcohol, acetone, ethyl acetate, methyl ethyl ketone and toluene. The resin for forming pores which may be used in the present invention may be at least one selected from a group consisting of polyethylene glycol, polyvinyl alcohol and polyvinyl propylene.

Specifically, the step of forming a sheet may comprise passing a mixture of a cellulose nanofiber and polyethylene nano particles dispersed in a solvent through a homogenizer to obtain a suspension solution, and decompressing the same to prepare a sheet form. The prepared sheet exhibits high tensile strength through strong hydrogen bond between the cellulose fibers. The number of times passing the homogenizer may be 5 to 20 cycles. Thereafter, through decompressing, the cellulose fiber may be uniformly aligned to form a sheet having a porous structure.

After decompressing, the sheet having a porous structure may go through a washing step using at least one selected from a group consisting of water, methyl alcohol, ethyl alcohol, propyl alcohol, acetone, ethyl acetate, methyl ethyl ketone and toluene, in order to remove the remaining resin for forming pores. Thereafter, the solvent is removed from the sheet through drying of the sheet, from which the resin for forming pores have been removed, to provide a substrate having a porous structure.

The step of drying the sheet may be conducted in the air, inert gas, or vacuum environment for 1 hour to 30 hours at a temperature of 40☐ to 80☐. For example, the step of drying the sheet may be conducted in the air for 20 to 30 hours at a temperature of 50 ☐ to 70☐. The solvent is removed through the step of drying, and pores are formed in areas from which the solvent has been removed. The step of drying the sheet may include a dehydrate-drying process using a decompression filtration device, but there is no limitation to the aforementioned method.

Further, when stacking the resin layer on both surfaces of the substrate, different resin layers may be used for the surfaces. Therefore, using a resin layer with improved shut-down function and a resin layer with improved porosity, it is possible to prepare a separator having different characteristics between both surfaces.

According to another aspect of the present disclosure, an electrochemical device comprising a cathode, an anode, and the aforementioned separator disposed between the cathode and the anode, may be prepared. The electrochemical device of the present disclosure includes any kind of device that shows electrochemical reaction, specific examples including any type of primary battery, secondary battery, fuel cell, solar cell or capacitor such as a super capacitor device and the like. Especially, preferable lithium secondary batteries include lithium metal secondary batteries, lithium ion secondary batteries, lithium polymer secondary batteries or lithium ion polymer secondary batteries and the like.

The cathode, anode and the like may be easily prepared by a process and/or method well-known in the related art.

Specifically, the cathode is prepared by applying, for example, a mixture of a cathode active material, a conductive material and a binder on a cathode current collector, and then drying it, and if necessary, a filler is further added to the mixture.

The cathode is prepared in a form where the cathode active material is bound to the cathode current collector according to a conventional method well-known in the related art. Here, as the cathode active material, conventional cathode active materials that may be used in cathodes of conventional electrochemical devices may be used, non-limiting examples including $LiCoO_2$, $LiNiO_2$, $LiMnO_2$, $LiMn_2O_4$, $Li(Ni_aCo_bMn_c)O_2$($0<a<1$, $0<b<1$, $a+b+c=1$), $LiNi_{1-Y}Co_YO_2$, $LiCo_{1-Y}Mn_YO_2$, $LiNi_{1-Y}Mn_YO_2$(here, $0 \leq Y<1$), $Li(Ni_aCo_bMn_c)O_4$($0<a<2$, $0<b<2$, $a+b+c=2$). $LiMn_{2-z}Ni_zO_4$, $LiMn_{2-z}Co_zO_4$(here, $0<Z<2$), $LiCoPO_4$, $LiFePO_4$, or a mixture thereof. Further, as the cathode current collector, a foil prepared from aluminum, nickel, or a combination thereof, may be used.

The anode is prepared in a form where the anode active material is bound to the anode current collector according to a conventional method well-known in the related art. Here, the anode active material may include, for example, carbon such as a hardly graphitizable carbon or graphite-based carbon; metal composite oxide such as $LixFe_2O_3$($0 \leq x \leq 1$), $Li_xWO_2$($0 \leq x \leq 1$). $Sn_xMe_{1-x}Me'_yO_z$ (Me: Mn, Fe, Pb, Ge;

Me': Al, B, P, Si, elements of Groups 1, 2 and 3 in the periodic table, halogen; $0<x\leq 1$; $1\leq y\leq 3$; $1\leq z\leq 8$); lithium metal; lithium alloy; silicon-based alloy; tin-based alloy; oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like; conductive polymer such as polyacetylene; and Li—Co—Ni material and the like may be used. Meanwhile, as the anode current collector, stainless steel, nickel, copper, titan, or alloy thereof and the like, may be used.

Further, the electrolyte that may be inserted between the electrode and the separator is a salt of a structure of $A^+B^-$ and the like, wherein $A^+$ includes ions selected from alkali metal cations such as $Li^+$, $Na^+$, $K^+$, or a mixture thereof, and $B^-$ includes ions selected from anions such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a mixture thereof, for example, the salt dissolved or dissociated in organic solvents being any one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof, but there is no limitation thereto.

Injection of the electrolyte may be performed at a suitable step of the battery manufacturing process according to the preparation process and required properties of the final product.

Processes for applying the separator of the present disclosure to a battery include a process of laminating and stacking the separator and electrode, and a folding process, besides winding, that is a general process.

Meanwhile, the embodiments of the present disclosure described in the present specification are just presented as specific examples to help understanding of the present disclosure, not to limit the scope of the present disclosure. It will become apparent to those skilled in the art that besides the embodiments disclosed herein, other modified examples that are based on the technical spirit of the present disclosure may also be implemented.

What is claimed is:

1. A separator for a secondary battery, comprising:
   a substrate comprising cellulose-based nanofiber and polyethylene nano particles,
   wherein the cellulose-based nanofiber and polyethylene nano particles are a homogenous mixture; and
   a resin layer stacked on both surfaces of the substrate, the resin being formed from a polyolefin,
   wherein the cellulose-based nanofiber and the polyethylene nano particles are present in a weight ratio of 7:3 to 9:1.

2. The separator of claim 1, wherein the polyolefin is at least one selected from a group consisting of polyethylene, polypropylene, polybutylene and polypentene.

3. The separator of claim 1, wherein the polyethylene nano particles have a melting point of 80 to 100° C., and the polyolefin resin has a melting point of 100 to 140° C.

4. The separator of claim 1, wherein the resin layer further comprises inorganic particles and a polymeric binder.

5. The separator of claim 1, wherein the resin layer is stacked in a lamination method.

6. The separator of claim 1, wherein the resin layer has a thickness of 3 to 20 μm, and the substrate has a thickness of 5 to 20 μm.

7. The separator of claim 1, wherein the cellulose-based nanofiber is made of any one selected from a group consisting of cellulose acetate, cellulose triacetate and cellulose butylate.

8. The separator of claim 1, wherein the cellulose-based nanofiber has a diameter of 10 nm to 500 nm and a length of 1 μm to 10 mm, and the polyethylene nano particle has a particle size of 50 nm to 500 nm.

9. A method of preparing a separator for a secondary battery, the method comprising:
   forming a sheet using a homogenous mixture of a cellulose nanofiber and polyethylene nano particles dispersed in a solvent;
   removing the solvent to provide a porous substrate; and
   stacking a resin layer formed from a polyolefin on both surfaces of the substrate in a lamination method,
   wherein the cellulose-based nanofiber and the polyethylene nano particles are present in a weight ratio of 7:3 to 9:1.

10. The method of claim 9, wherein the solvent comprises a resin for forming pores and at least one selected from a group consisting of water, methyl alcohol, ethyl alcohol, propyl alcohol, acetone, ethyl acetate, methyl ethyl ketone and toluene, to which is added.

11. The method of claim 10, wherein the resin for forming pores is at least one selected from a group consisting of polyethylene glycol, polyvinyl alcohol and polyvinyl propylene.

* * * * *